(12) United States Patent
Wiebe

(10) Patent No.: US 8,029,218 B2
(45) Date of Patent: Oct. 4, 2011

(54) STACKED CARGO SECURING DEVICE AND METHOD OF USE

(75) Inventor: Marvin Wiebe, Chilliwack (CA)

(73) Assignee: 2Secure Cargo Systems Inc., Abbotsford (CA)

( * ) Notice: Subject to any disclaimer, the term of this patent is extended or adjusted under 35 U.S.C. 154(b) by 642 days.

(21) Appl. No.: 12/078,280

(22) Filed: Mar. 28, 2008

(65) Prior Publication Data

US 2008/0247838 A1 Oct. 9, 2008

Related U.S. Application Data

(63) Continuation-in-part of application No. 10/581,992, filed on Jun. 7, 2006.

(60) Provisional application No. 60/907,389, filed on Mar. 30, 2007.

(51) Int. Cl.
*B60P 7/08* (2006.01)

(52) U.S. Cl. ........... 410/98; 410/34; 410/40; 410/41; 410/97; 410/99; 410/100; 410/155

(58) Field of Classification Search ........... 410/34, 410/35, 39, 40, 41, 96, 97, 98, 99, 100, 120, 410/122, 155; 24/302, 265 CD; 206/453, 586, 593; 248/499
See application file for complete search history.

(56) References Cited

U.S. PATENT DOCUMENTS

| | | | |
|---|---|---|---|
| 5,584,623 A | 12/1996 | Nadherny | |
| 5,878,548 A | 3/1999 | Sauer et al. | |
| 5,980,173 A * | 11/1999 | Danekas et al. | ............... 410/99 |
| 6,611,995 B2 | 9/2003 | Jackson et al. | |

* cited by examiner

*Primary Examiner* — Stephen Gordon
(74) *Attorney, Agent, or Firm* — Clark & Brody

(57) ABSTRACT

A load securing device for stacked cargo comprises a body member having contact surfaces adapted to engage a side portion of a cargo item that is stacked on a pair of each of a pair of stacked cargo items. One end of a flexible member such as a strap is attached to the body member. The flexible member extends through a space created between the stacked items or the stacked items and a carrier surface, with its other end being secured to a carrier supporting the stacked items. Optimally, and when expecting forces to be applied to both sides of the stacked items, a load securing device is placed on either side of the stacked items so that forces arising during the transport of the stacked items are resisted in both directions.

3 Claims, 14 Drawing Sheets

STACKED CARGO SECURING DEVICE AND METHOD OF USE

This application is a continuation-in-part of application Ser. No. 10/581,992 filed on Jun. 7, 2006, and a claim of priority under 35 USC 119(e) is made based on provisional application No. 60/907,389, filed on Mar. 30, 2007, and provisional application No. 60/636,014, filed on Dec. 15, 2004.

FIELD OF INVENTION

The present invention is directed to a stacked cargo securing device, and particularly a device designed to interface with portions of stacked cargo to resist forces, particularly lateral forces, applied to the cargo during transport.

BACKGROUND ART

In the prior art, it is well known to secure loads being transported on a carrier such as a pallet or other support structure, a flat bed trailer using tensioned flexible members that secure the loads to the carrier. This is particularly so when transporting lumber, pipes, and the like. In these arrangements, one or more belts are draped over the load or between stacked loads. One end is usually attached to the carrier first, with the other end subsequently attached. The belt is then appropriately tensioned to hold the load in place. FIG. 1 shows a typical arrangement for securing stacked cargo, wherein load pairs 1, 3, and 5 are stacked on a surface 7 of a support structure or carrier 9. Belts 11 are interleaved between loads 3 and 5, with the end of the belt 13 secured to the carrier at winch mechanism 15 in a conventional fashion. Although not shown, the same attachment is made on the other side of the carrier 9. Although not shown, additional belts should cross over the top of the load pairs 5.

One significant failing in the transport of multi-tiered or stacked items is their susceptibility to shift relative to each other due to acceleration forces experienced during transport. Such shifting may result in the stacked items to be unsecured, and fall off the carrier. This problem is especially acute for intermediate tiers in a stack of two or more items as shown in FIG. 1. Although this prior art method of securing improves the stability of the intermediate items, these items are only marginally secured by frictional contact with the items above and below, still making them susceptible to lateral shifting movements in response to the lateral acceleration forces experienced when mounted to a vehicle making a sharp turn or mounted on a boat encountering rough water.

Thus, there is a need to provide improved devices and methods to better secure loads during transport. The present invention responds to this need by providing a load securing device that effectively resists loads, and particularly lateral loads that may arise during the transport of stacked items.

SUMMARY OF THE INVENTION

It is an object of the invention to provide an improved device for securing stacked items during transport.

Another aim of the invention are load securing devices designed to engage the sides of stacked loads or items and provide resistance to forces that may occur during transport of the loads or items.

One other object of the present invention is a method of securing one or more sets of stacked loads or items by providing devices configured to hold the stacked loads at side portions thereof during their transport.

Yet another object of the invention is a load securing device subcombination, wherein the device is used with existing rings and belts or straps.

Other objects and advantages will become apparent as the description proceeds.

One aspect of the invention involves a method of securing stacked items on a carrier by providing at least first and second loads, the first load placed on a carrier surface, with the second load stacked on the first load, a space existing between the first and second loads. A first load resisting member is positioned against one side portion of each load, and secured to the carrier using a first flexible member. One end of the first flexible member is attached to the first load resisting member, with the other end secured to the carrier, the first flexible member passing through the space.

Depending on the location of the first and second loads, a second load resisting member can be positioned against the other side portion of each load, and secured to the carrier via a second flexible member, with one end of the second flexible member attached to the second load resisting member, with the other end secured to the carrier, the second flexible member passing through the space.

A number of first and second loads can be placed on the carrier for securement using the first or first and second load resisting members. In addition, more that a pair of loads can be positioned on the carrier, with load resisting members used to secure adjacent loads together. The load resisting members can be positioned on one or both of the sides of the loads or ends depending on the configuration of the loads and carrier.

Another aspect of the invention is a load securing assembly employing the load resisting member and flexible member. In this embodiment, the load resisting member has a body with a pair of load bearing surfaces, with one end of the flexible member secured to a central portion of the body of the load resisting member. The central portion of the body generally aligns with a separation of the pair of load bearing surfaces. The other end of the flexible member is free to allow attachment to the carrier and subsequent tensioning.

The body can have one or more elongate ribs running traverse to the body longitudinal axis and/or along a length thereof, the load bearing surface being generally perpendicular to a plane of the rib. A ring or other attachment device can be attached to one end of the flexible member, the central portion of the body adapted to retain the ring thereon. The central portion of the body can have a notch, whereby the ring is adapted to engage the notch during tensioning of the flexible member. The flexible member can be virtually type, with preferred types including one of a belt, cable, chain or the like.

The invention also entails the load resisting member as a body having a load bearing surface extending over first and second body portions, respectively. One or more strengthening ribs can be employed, along a length of the body and/or traverse to its length. The longitudinally-running rib(s) can extend in a direction generally parallel to the load bearing surfaces of the first and second body portions. The load resisting member includes a notch formed between the first and second body portions, the notch adapted to engage a ring so that the ring is secured to the body between the first and second portions of the body, the ring adapted to attach to one end of a flexible member for securing load using the load bearing surfaces. The notch can be positioned so as to divide the body so that the first body portion is more than half the length of the body.

The body can be elongated and the load bearing surface of the first portion of the body can have a width less than a width of the load bearing surface of the second portion. A first segment of the rib aligned with the first portion can have a width less than a width of a second segment of the rib aligned with the second portion, the differences in width creating a stop between the first and second portions and allowing the ring to slide over the first portion and first segment and reach the notch, the stop limiting rotation of the ring. The first and second portions and/or the rib can include openings therein, and the load bearing surface can include one or more protrusions to increase grabbing power of the surface when contacting cargo.

Another aspect of the invention involves the use of a safety mechanism to retain the ring onto the notch during use. In one embodiment, the safety mechanism includes a housing that slides along a length of the body. In an open position, the housing exposes the notch for ring attachment or removal. In a locked position, a portion of the housing covers the ring to maintain its seat in the notch. Other mechanisms that maintain the ring in the notch during use such as pivoting arms or the like could also be employed.

Yet another aspect of the invention involves using a modified load securing device to accommodate a single load spanning one or more underlying loads or surface. One method of securing these types of loads comprises providing at least first, second and third loads, with the first and second loads placed on a surface so that upper surfaces of the first and second loads are generally horizontal. A third load is stacked on the first and second loads, a space existing between the first and second loads and the third load. An angled load resisting member is positioned against one side portion of the third load so that it also rests on one of the first and second loads. The angled load resisting member secures the load to the carrier via a first flexible member, one end of the first flexible member attached to the angled load resisting member, with the other end secured to the carrier. The flexible member passes through the space between the loads. An optional aspect of this method is using a second angled load resisting member against the other side portion of the third load, and securing the second angled load resisting member to the carrier via a second flexible member in the same manner as the first angled load resisting member. The second and third loads can be replaced by a single load that is wider and/or longer than the first load or just a surface of the carrier being used to transport the load that is larger than a footprint of the single load being secured using the angled load resisting member.

A number of loads on the carrier can be secured using the first and/or second angled load resisting members. The load faces of the top load contacting the angled load resisting member can be either lateral side portions or front and back side portions.

The angled load resisting member aspect of the invention also includes the angled load resisting member in combination with the flexible member for securement purposes. The flexible member can include a ring adapted to attach to the one end of the flexible member, the central portion of the angled member adapted to retain the ring thereon. The central portion can include a groove, and the groove can be complementary in shape to the ring is used.

As an alternative safety mechanism, a torsion spring is included as part of the load resisting device in any embodiment. The torsion spring allows attachment of the flexible member by spring compression in one direction, while providing a stop by spring expansion once the flexible member is located in its proper location.

DESCRIPTION OF THE PREFERRED EMBODIMENTS

The invention provides a significant improvement in the ability to transport stacked items on a carrier such as a truck or other vehicle, or an intermediate carrier such as support structure adapted to be used with a vehicle, e.g., a pallet or the like. Unlike prior art methods which generally only apply a resisting force on the top of the stacked items and minimal lateral force resistance, the invention allows a resisting force to be applied to sides of the stacked items. This arrangement provides far superior ability to stabilize the stacked items during their transport.

Figure 3:
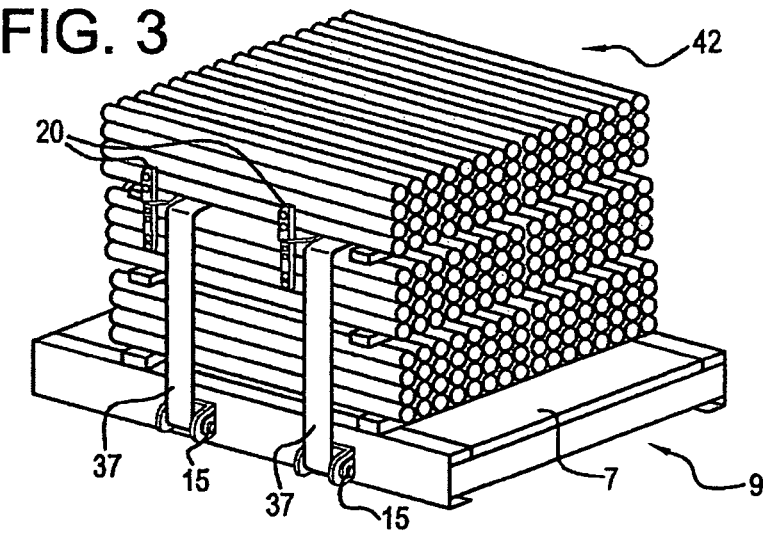
Figure 4:
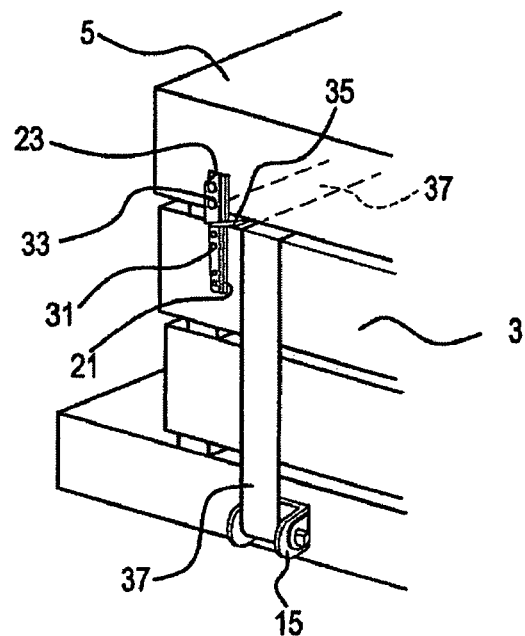
FIG. 4 shows an enlarged and partial view of FIG. 2.
Figure 5A:
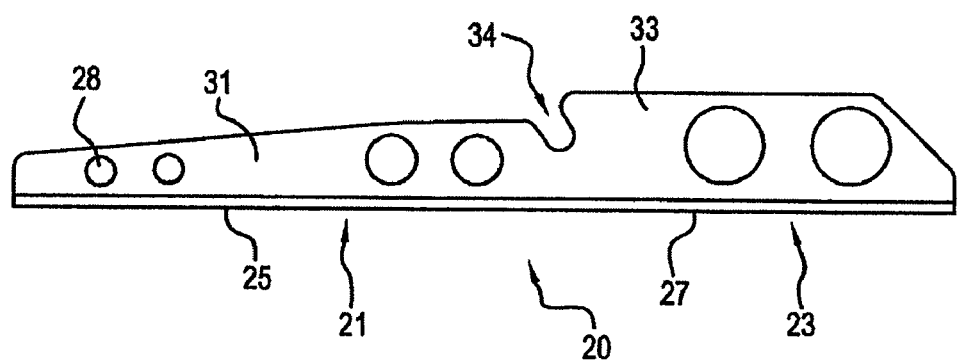
FIGS. 5a and 5b show top and side views respectively of the securing device of the invention.
Figure 5B:
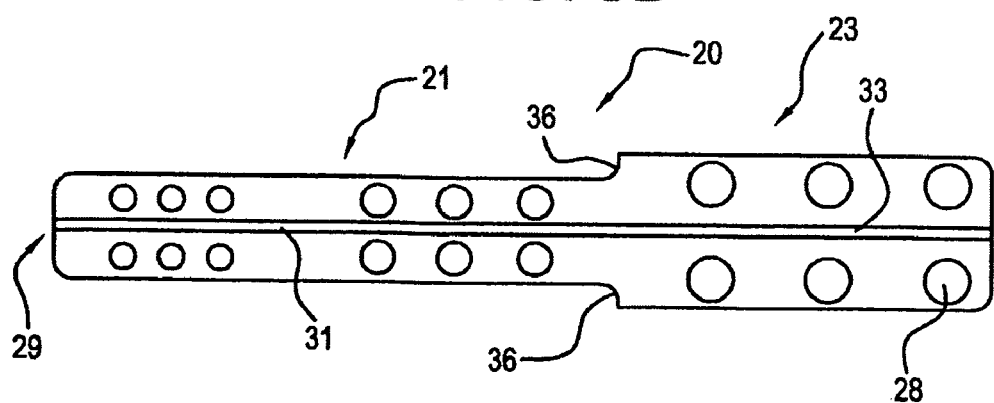
Figure 6:
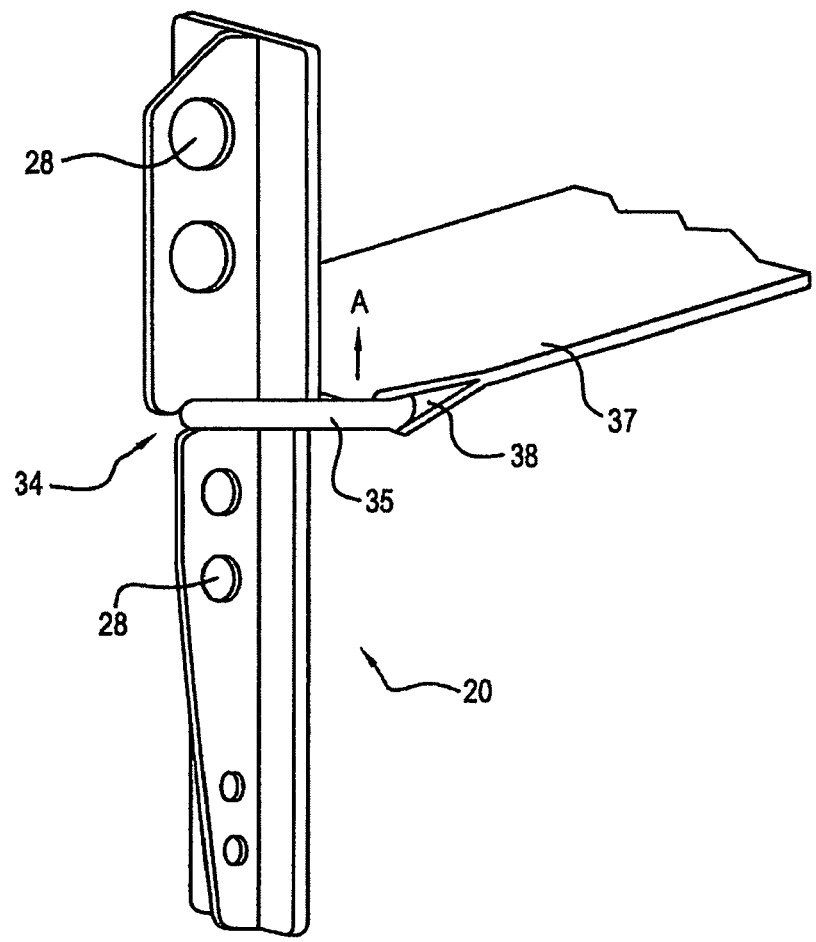
FIG. 6 is an enlarged perspective view of the load securing device with ring and belt.

One embodiment of the invention is shown in FIGS. 2-6. Referring specifically to FIG. 5a-6, the load securing device comprises a body 20 having first and second portions 21 and 23. Each portion has a generally flat surface 25 and 27. The body 20 also includes a rib 29 having first and second segments 31 and 33, the rib running longitudinally along the body 20 and generally perpendicular to the surfaces 25 and 27. The rib provides strength to the body and surfaces 25 and 27 during use of the device as explained below. The body 20 interfaces with a ring 35 and belt 37 to secure the stacked loads as described in more detail below.

Referring particularly to FIG. 6, the body 20 has a notch 34 separating the rib segments 31 and 33 and body portions 21 and 23. The notch 34 is adapted to receive a corner portion of the triangular-shaped ring 35. Another portion of the ring is attached to the belt 37 using looped end 38. In concert with the notch, edges 36 are formed at the termination of body portion 23, the edges 36 acting as a stop against movement in direction "A". This arrangement keeps the ring 35 linked or secured to the body 20, and limits rotation of the ring 35 about the notch to further enhance the holding power of the device. To facilitate securement of the ring 35 to the body 20, the rib segment 31 and body portion 21 have respective widths that are less than their counterparts 33 and 25. This allows the ring 35 to slide along body portion 21 and rib segment 33 and engage the notch 34 and edges 36. While a triangular ring 35 is shown, other shapes can be used to link the belt 37 to the body 20. Moreover and while the stop configuration is preferred to help stabilize the loads, the ring could be linked to the body 20 in a freely rotatable manner if so desired, e.g., use just the notch or another securing means as detailed below.

Each of the rib segments 31 and 33 and body portions 21 and 23 can have openings 28 to make the body lighter in weight. However, the openings are optional, and the body could be made of high strength and light weight material if so desired that would not need the openings. In fact, the body 20 can be made out of any material having sufficient strength to resist forces when applied thereto during use, e.g., high strength aluminum alloys, titanium or titanium alloys, polymers or composite materials and the like. If the material is strong enough, the rib could be optional.

The configuration of the notch 34, edges 36, rib segments 31 and 33, and body portions 21 and 23 function as a means for securing the ring 35 to the body 20, but the disclosed embodiment should be considered exemplary in this regard. For example, the ring 35 could be permanently secured to the body 20 if so desired. Alternatively, it could be attached to openings in one of the rib and/or body portion rather than be secured in the slip fitting fashion described above. In fact, virtually any type of securement whether it is a removable type as illustrated or a more permanent type that would use the ring, or the ring and the belt could be employed. It is preferred that the body 20 be adapted for removable securement to the ring 35 since the ring 35 and belt 37 are readily available due to their common use to secure loads using the prior art techniques shown in FIG. 1. Thus, one only needs to have the body member and its means for securing the ring thereto in order to use it in its novel way when rings and belts are available.

Figure 1:
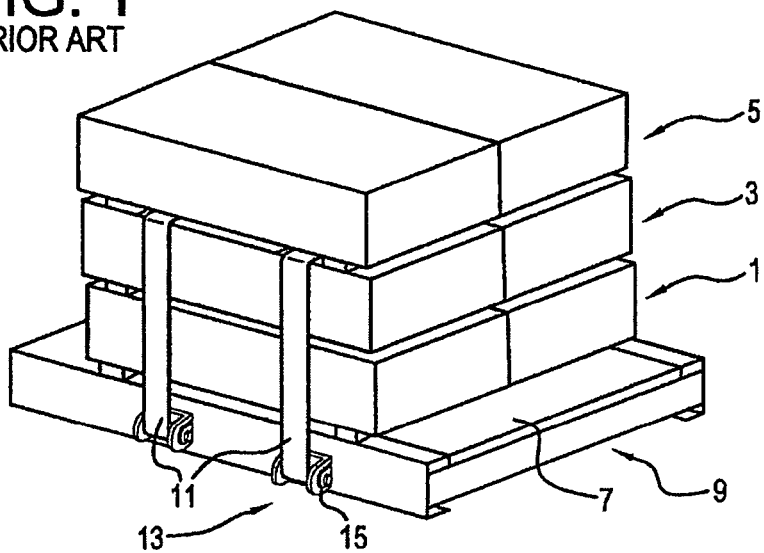
FIG. 1 is a perspective view of a prior art technique for securing stacked cargo.
Figure 2:
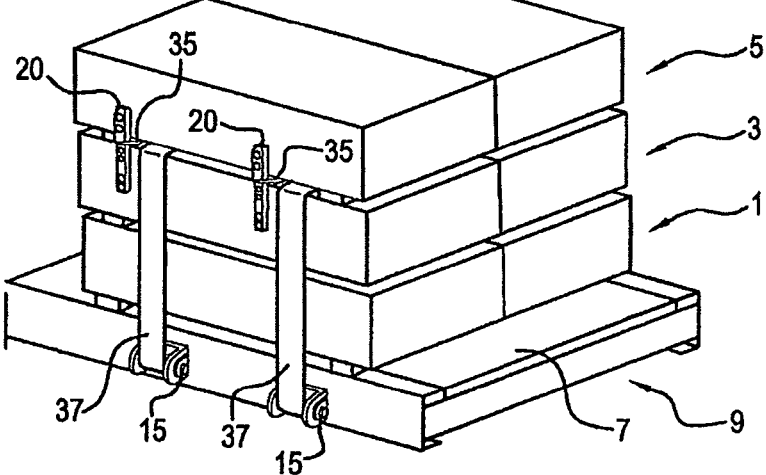
FIGS. 2 and 3 show perspective views of stacked cargo employing the invention.

Referring to FIGS. 2-4, the load securing device is illustrated in use. The load pairs 1, 3, and 5 of FIG. 1 are depicted in FIG. 2 with four load securing devices 20, two shown, with two others on the other side not being shown. A ring 35 is shown secured in the notch 34 of each body 20, with the belt 37 attached to a respective ring interleaved between the load pairs 3 and 5.

In FIGS. 2-4, the belts 37 that have one end attached to the hidden bodies 20 is shown. The other free end of the belt is secured to the carrier at a given winch mechanism 15 (not shown). The winch mechanism 15 is tightened to tension the belt 37. With this tightening, the body portion 23 of the body 20 member not shown is pressed against the side portion of the load 5, with the body portion 21 pressed against the side of load 3. This same procedure would be repeated with the depicted load securing devices, wherein the hidden winch mechanism is tightened to tension the belt (not shown) so that the depicted body 20 is laterally forced against the sides of the loads 3 and 5. With a pair of securing devices as the body 20 and its means to attach to the ring 35 are mounted on each side of the load pairs 3 and 5, see FIG. 2, lateral forces applied to the loads are effectively restrained.

While load pairs 1, 3, and 5 are shown in FIGS. 2 and 4, other loads can be secured using the load securing device. FIG. 3 shows an alternative use wherein tubular items 42 as the load are secured. The loads that are stacked could be unitary loads wherein a single load is stacked upon another load. Alternatively, each stacked load could be made up of two or more items, e.g., the load pairs of FIG. 2, or the bundles of pipe in FIG. 3.

In the exemplified uses, the load securing device is used on either side of the stacked load pairs 1, 3, and 5. However and although the device is exemplified to resist lateral loads, it could be employed to resist movement front to back on a vehicle or other support structure. In this mode, the devices could be employed to contact front and rear portions of cargo, rather than or in addition to the opposing side portions as illustrated in the drawings. In yet other uses, any number of load securing devices can be used in horizontal combination, e.g., in two pairs to resist lateral forces as shown in FIGS. 2 and 3. In addition, the devices could be employed vertically to secure a number of stacked items or loads, e.g., interleaving between first and second stacked loads, between second and third stacked loads, and/or between third and fourth stacked loads. Further yet, a combination of vertical and horizontal positioning of the devices could be employed if the stacks of cargo were sufficiently long and high enough to warrant the use of the plurality of load securing devices.

While a separate structure is exemplified as the carrier for transporting the stacked items, virtually any type of a carrier, whether it is a vehicle itself that travels on water, air or ground, or is a support structure to be mounted to the vehicle is adaptable for the invention. As long as the carrier has a surface to support the stacked items, and has structure either as part of the carrier or in proximity to the carrier so that it can hold one end of the flexible member, e.g., the belt, can be used in conjunction with the invention. Likewise, the stacked items can be any shape and any type, just as long as the stacked items have a space between them to allow for travel of the flexible member.

While a belt is exemplified as one type of flexible member, virtually any type of a flexible member that would allow the winch mechanism or other device to provide tension for securing purposes could be used. For example, more rigid flexible members such as cables or chains could be employed as long as some tensioning device or means is present to ensure that the connection between the body 20 and the carrier is tensioned for transport.

It should also be understood that although the body 20 is formed in an elongate shape, other configurations could be employed, square, oval, etc. In addition, the proportions of the first and second portions 21 and 23 could be modified depending on the required application. While the dominant portion of the body 20 is shown as 21, portion 23 could be dominant, or both portions could be equal, with the notch bisecting the body 20. While it is preferred to have the body 20 with generally flat surfaces 25 and 27 to maximize contact with the side portions of the loads, the surfaces 25 and 27 could have raised protrusions or other friction enhancing features if so desired.

In an alternative use, if the cargo is positioned such that forces need to be resisted on only one side of the cargo, just one load securing device could be employed, or more than one, just that all devices would be on the same side of the cargo. This may occur if the load is against an immovable structure such as a wall, wherein the wall would resist movement of the load. In such a scenario, the only requirement would be the ability to secure the free end of the belt for tensioning purposes.

Figure 7:
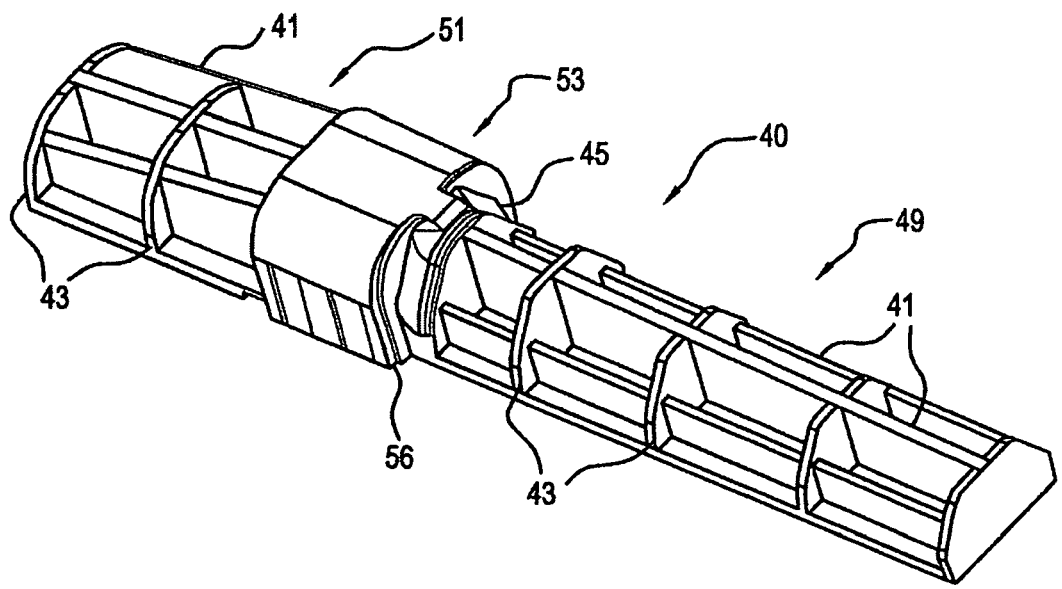
FIG. 7 is a perspective view of an alternative load resisting member of the load securing device.
Figure 8A:
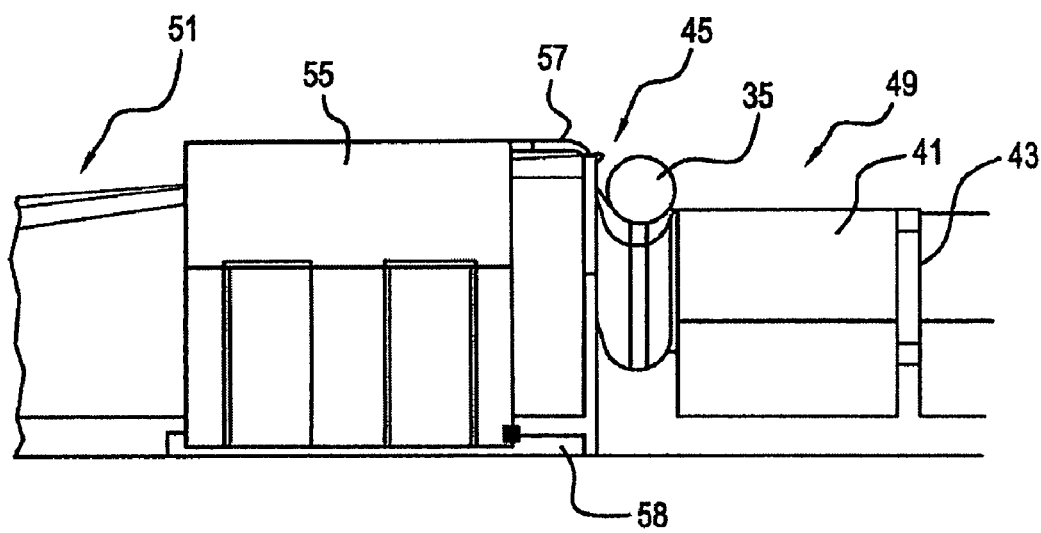
FIGS. 8a and 8b are side views of the load securing device of FIG. 7 showing the operation of the safety latch.
Figure 8B:
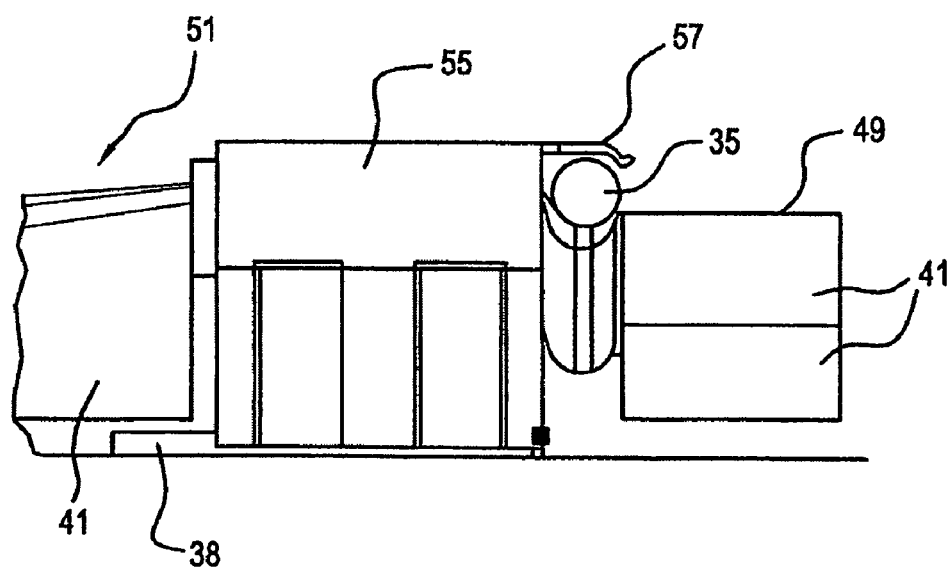

Referring to FIGS. 7-8b, another embodiment of the invention is illustrated. This embodiment shows an alternative design for the load resisting member which is designated by the reference numeral 40. This member is fabricated from non-metallic material such as a high strength polymer or plastic and therefore has a number of strengthening features such as longitudinal ribs 41 and lateral ribs 43. As stated above, the ribs can be optional if the polymer is sufficiently strong to form the load resisting member without the need for a rib or ribs. The load resisting member 40 also has a notch 45 to accommodate the ring 35, and a first portion 49 and a second portion 51, the first and second portions similar to those described above. A safety latch 53 is provided that is designed to keep the ring 35 in the notch 45 during use.

Referring to FIGS. 8a and 8b, the latch 53 is formed as a u-shaped housing 55 that is designed to slide on the body of the load resisting member 40 and between an open position as shown in FIG. 8a and a locking position as shown in FIG. 8b. The latch has lips 56 (only one shown) that assist in securing the latch 53 to the load resisting member 40 by entering the slot 58 and engaging an underside of the load resisting member 40. The latch 53 has an arm 57 that extends from one side of the housing 55, the arm 57 shaped to hold the ring 35 in place after it engages the notch 45. More particularly, the arm 57 is curved in shape to that in the position shown in FIG. 8b, its free end acts as a stop from preventing the ring 35 from exiting the notch. The arm 57 has some resilience so that the free end lifts over the ring 35 when moving the housing 55 to the open position. While the safety latch is shown as a sliding housing with an arm to engage the ring in the notch, other latching mechanisms or means could be employed to keep the ring in the notch during use, e.g., a latching arm could be pivotally mounted to the load resisting member, with the arm pivoting into a latched position to retain the ring. To open, the arm could be pivoted in the opposite direction and latched into a storage position for ring removal.

Figure 9:
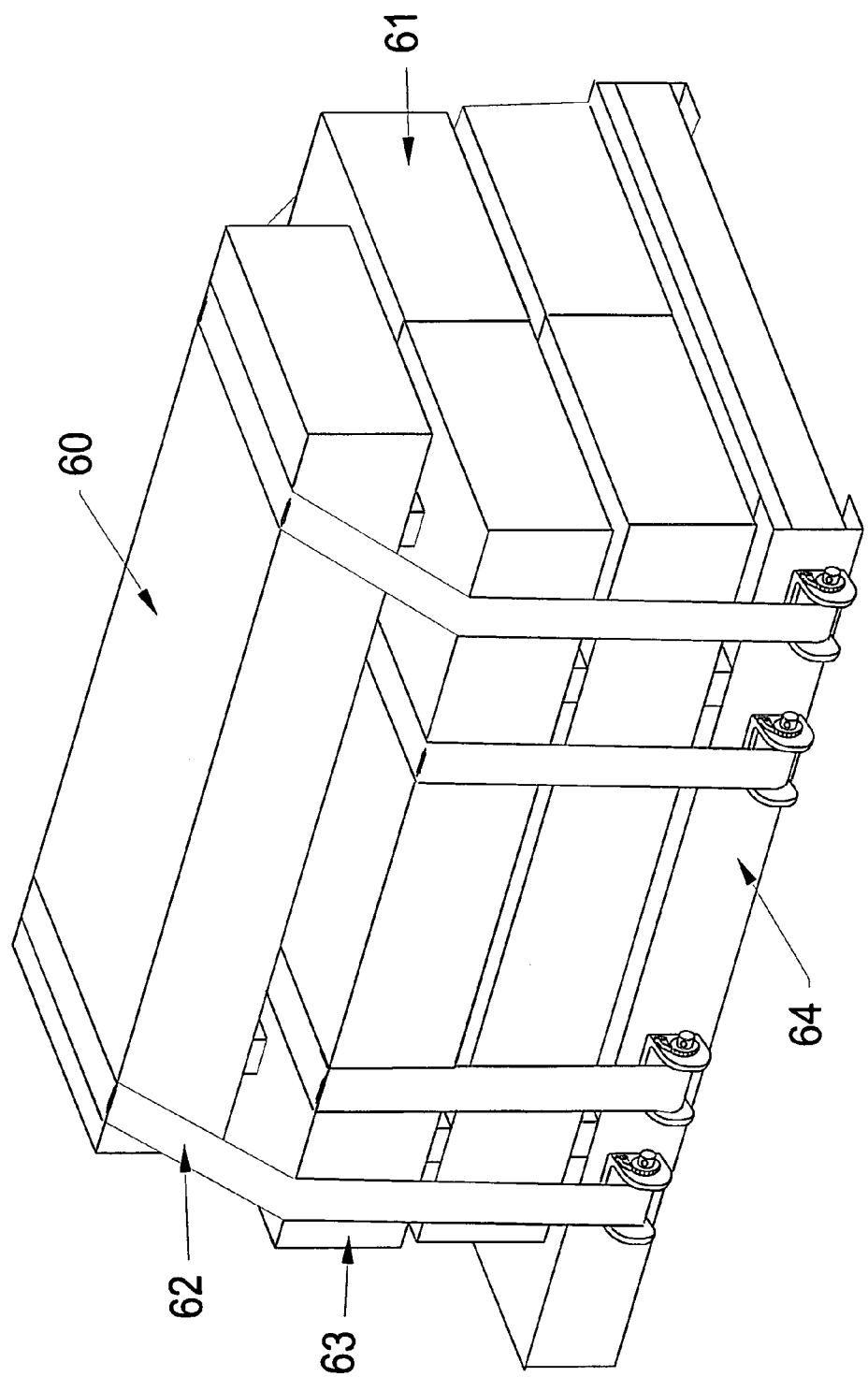
FIG. 9 is a prior art schematic view of a different load arrangement creating a different load bearing problem.

Another aspect of the invention involves a slightly modified load securing device. In some instances, instead of stacked loads, wherein each load is directly above an underlying load, a top load will span two bottom loads, with the top load centered between the two lower loads. This is shown in FIG. 9, wherein the top load 60 is shown positioned between the bottom loads 61 and 63. Typically, the load 60 is held with a flexible member or strap 62. In this instance, the load securing device having a pair of load bearing surfaces will not adapt to the centrally positioned top load 60 since the side face 65 of the top load intersects with a top face 67 of one of the bottom loads. However, this configuration creates the same problem in the possibility of load shifting during movement of the vehicle 64 and a need other than the load securing device of FIG. 2 to secure the load 60 exists.

Figure 10:
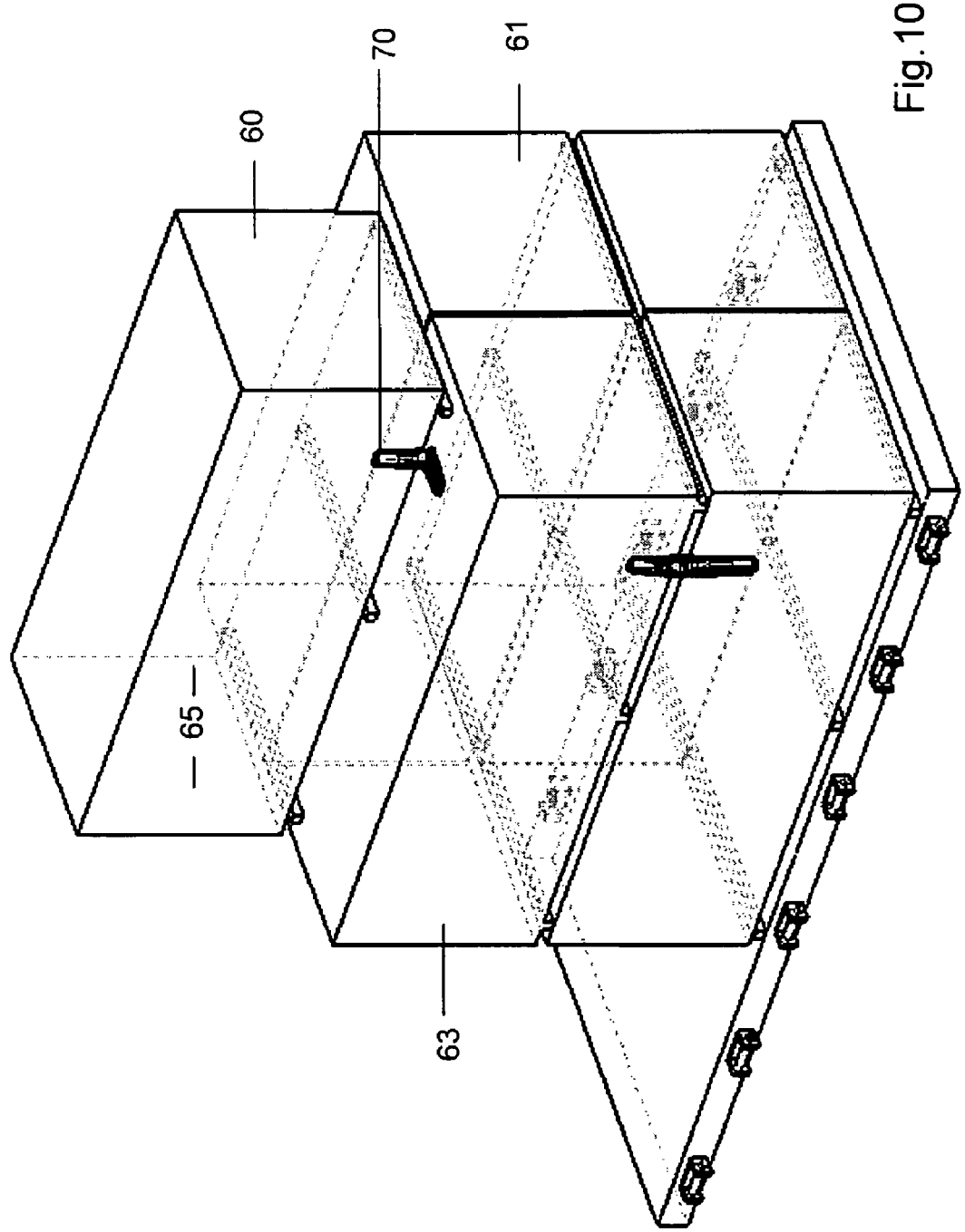
FIG. 10 is a perspective view of another embodiment of the invention designed to secure differently stacked loads.
Figure 11:
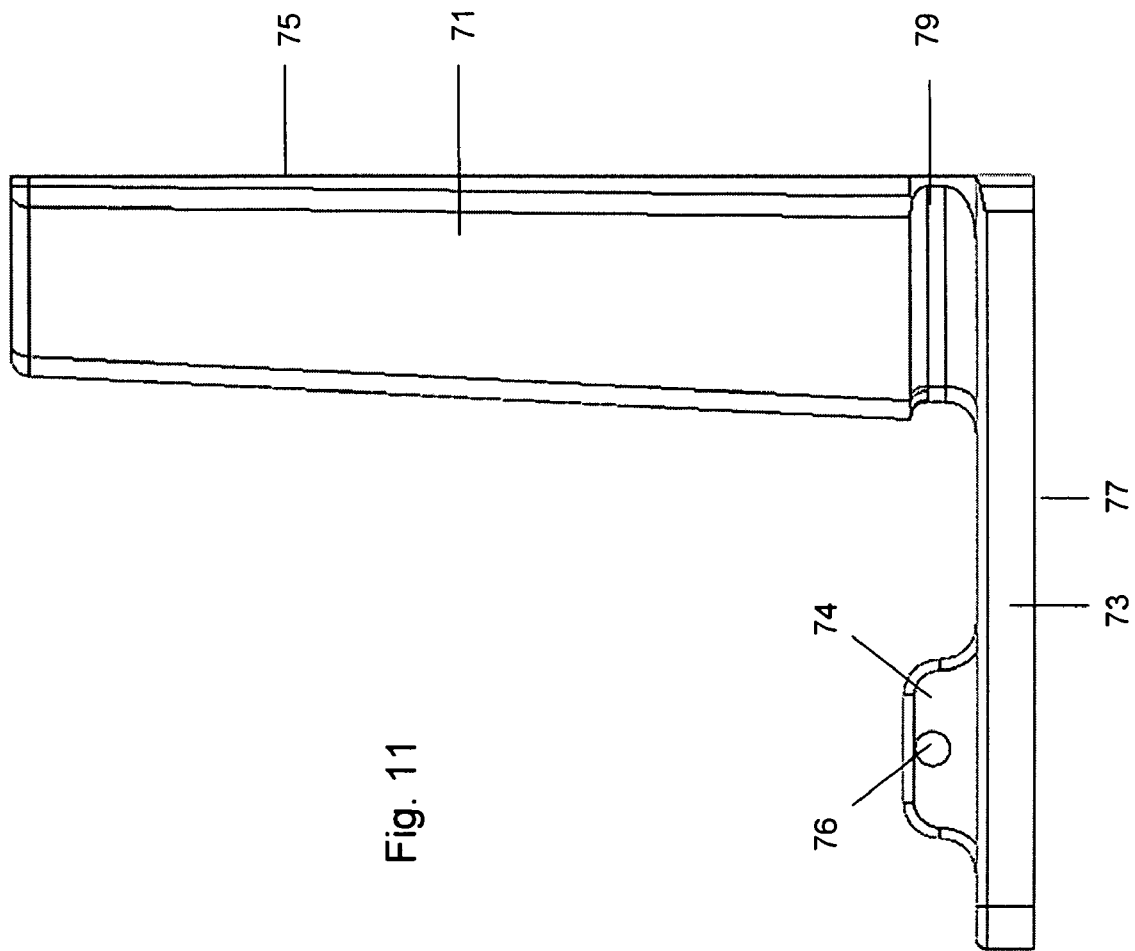
FIGS. 11-13 are different views of the load securing device of FIG. 10.
Figure 12:
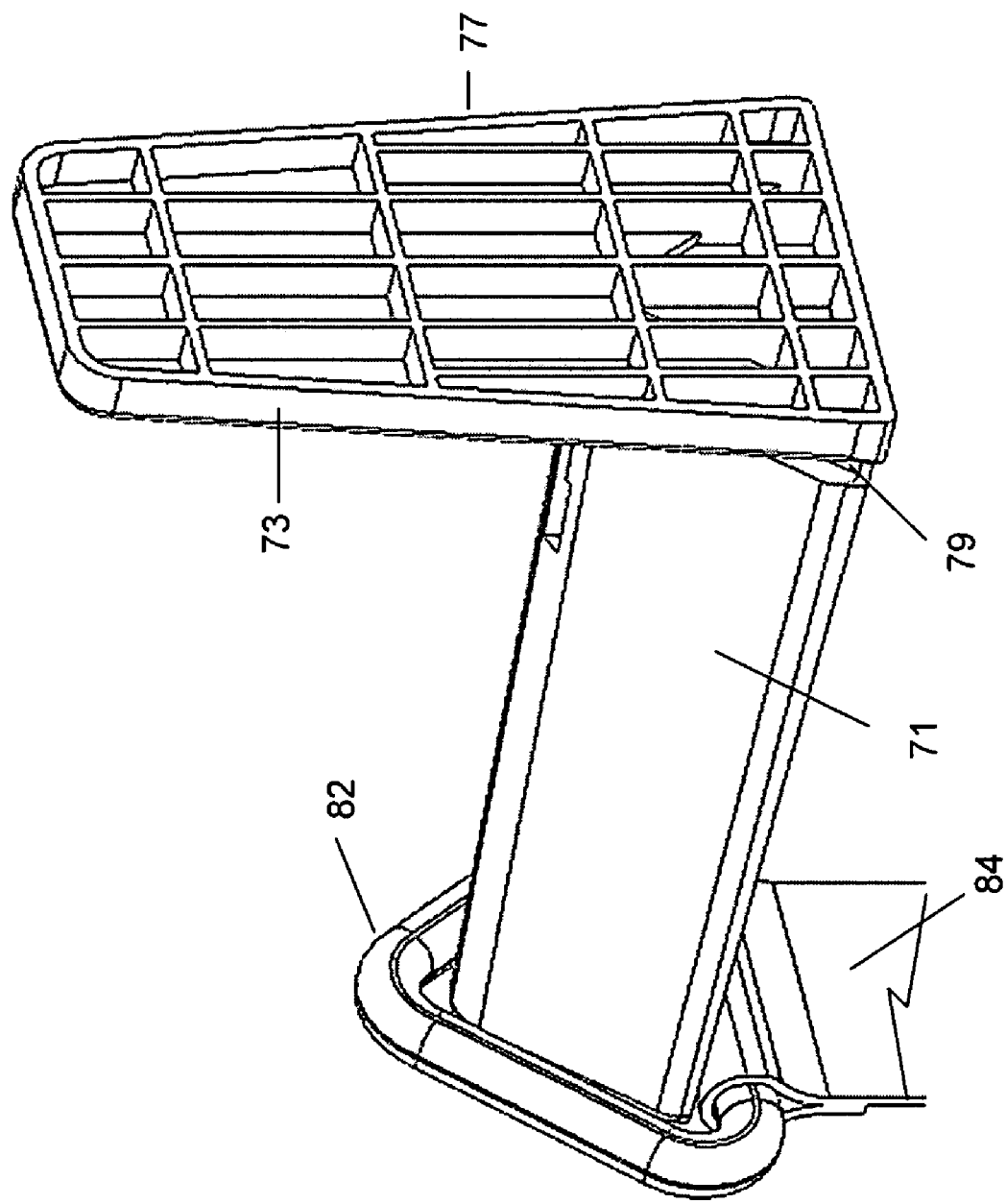
Figure 13:
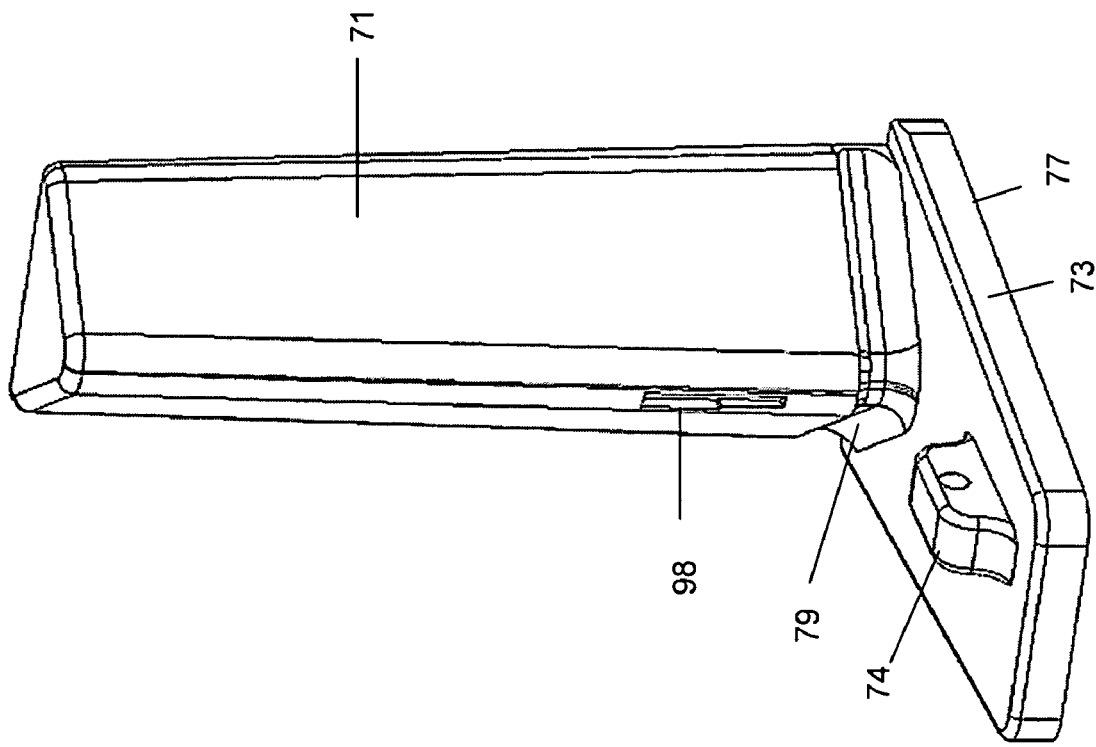

In order to properly restrain the top load 60 from movement, a load securing device 70 is used as shown in FIG. 10. FIGS. 11-13 show the device 70 in greater detail. The device 70 includes a first member 71 and a second member 73. The first member 71 has a first load bearing surface 75 adapted to contact the face 65 of the load 60. The base or second member 73 has a surface 77 adapted to contact the face 67 of the load 63. The device 70 also have a groove 79 positioned near each of the first and second members 71 and 73. The groove in this embodiment is shaped with a cross section that generally matches the cross section of a D-ring 82, see FIG. 12, to better facilitate attachment of the device 70 to a strap 84 and maintaining the device in the proper orientation when being used as described in more detail below. The groove 79 allows one end of a strap or the like to be attached to the member 71, the strap threaded between the load 60 and loads 61 and 63, and have the other end of the strap attached to the vehicle. This strap and load securing device arrangement acts against movement of the load in the direction of the device 70 and keeps the load 60 secured. While not shown in FIG. 10, a second load securing device would be positioned along the face of load 60 opposite face 65 and to rest on the load 61. The same strap arrangement would be used for securement of the opposing load securing device.

The device 70 can also have a protrusion 74 with an opening 76. The protrusion 76 extending from the member 73 permits the opening 76 to be used to facilitate storing the device 70. For example, the device can be supported by a hook engaging the opening 76, with the hook attached to a structure directly or indirectly such as with a rope or other elongated member.

While the device 70 is shown restraining the top load 60 placed on two bottom loads 61 and 63, it is conceivable that the top load 60 could be restrained when resting on a single load that would have a footprint larger than the top load 60, e.g., wider and/or longer, or on a surface that, in area, is more than an area occupied by the top load, e.g., the surface of the carrier such as a truck or truck trailer, rail car, ship, and the like.

Figure 14:
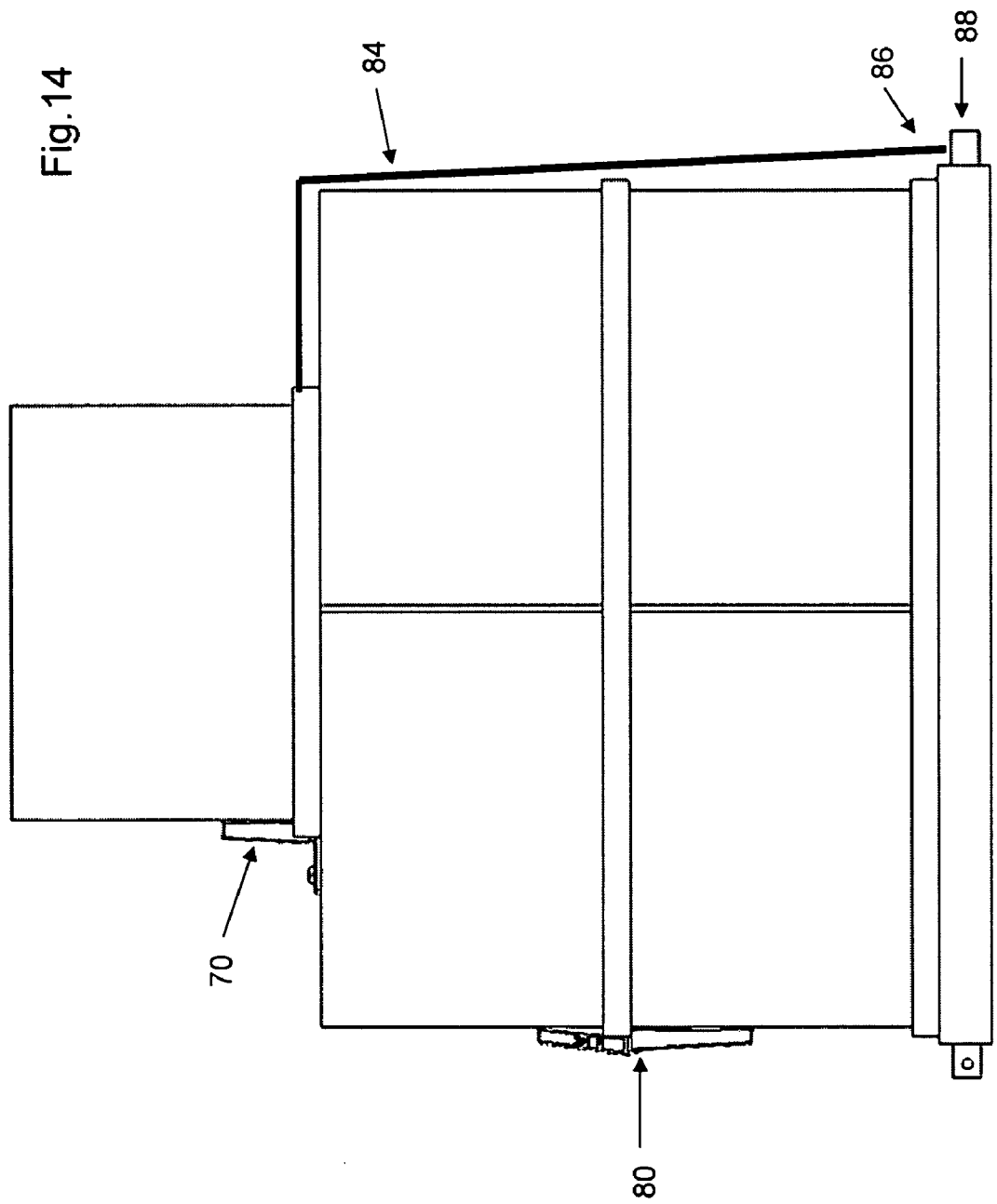
FIG. 14 shows another view of the stacked load of FIG. 10.
Figure 15:
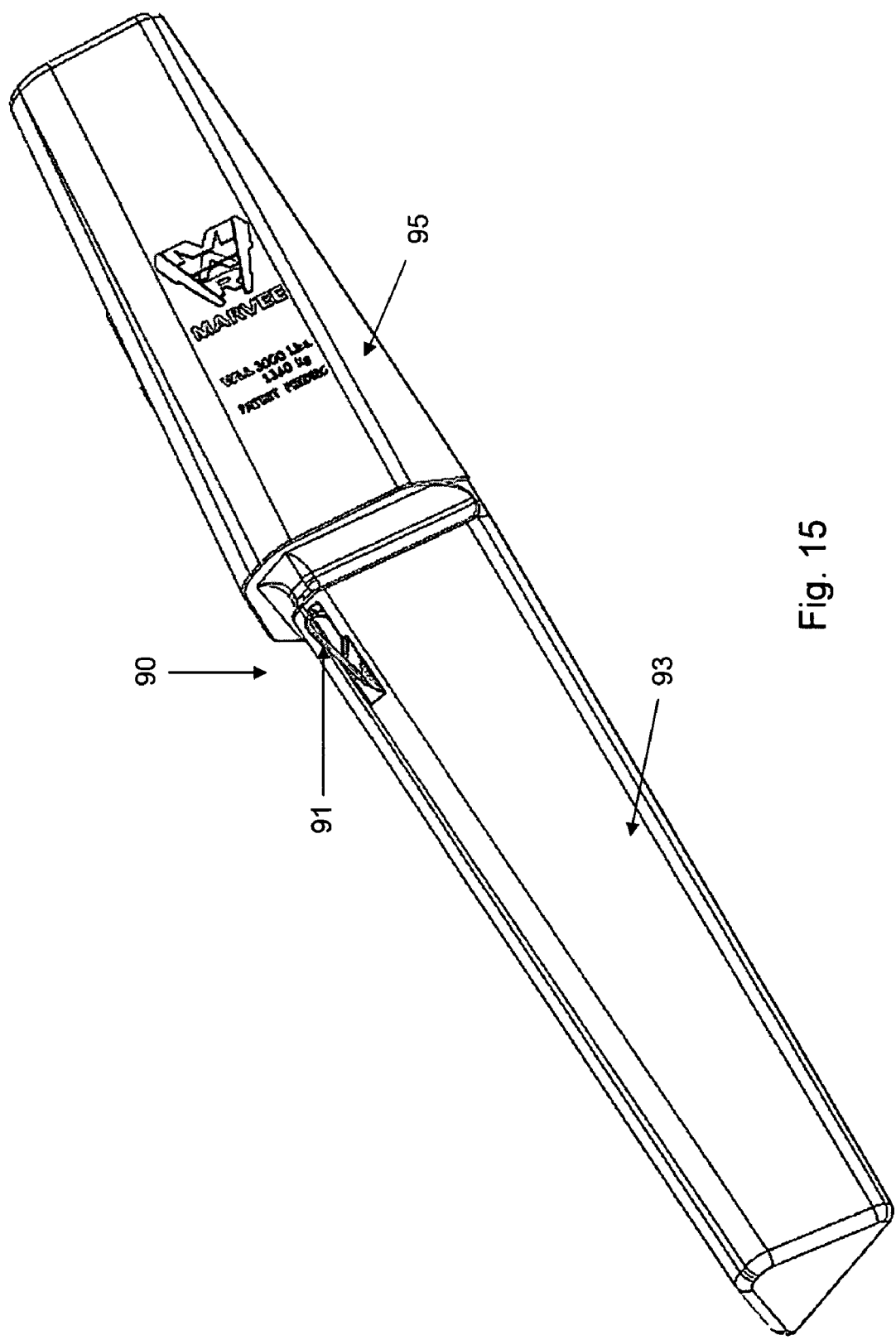
FIGS. 15-18 show an alternative safety mechanism for one of the load securing device of the invention.
Figure 16:
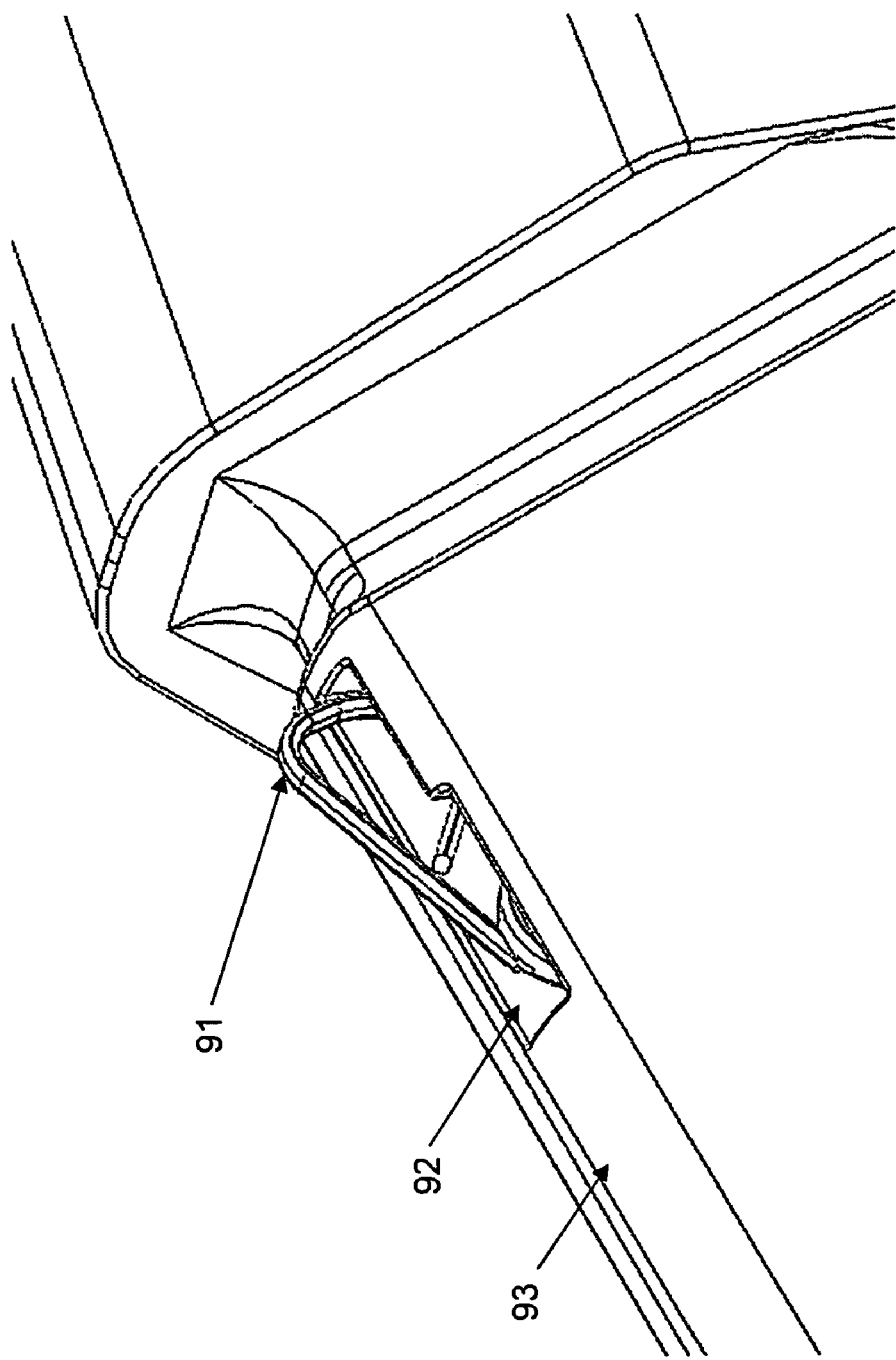
Figure 17:
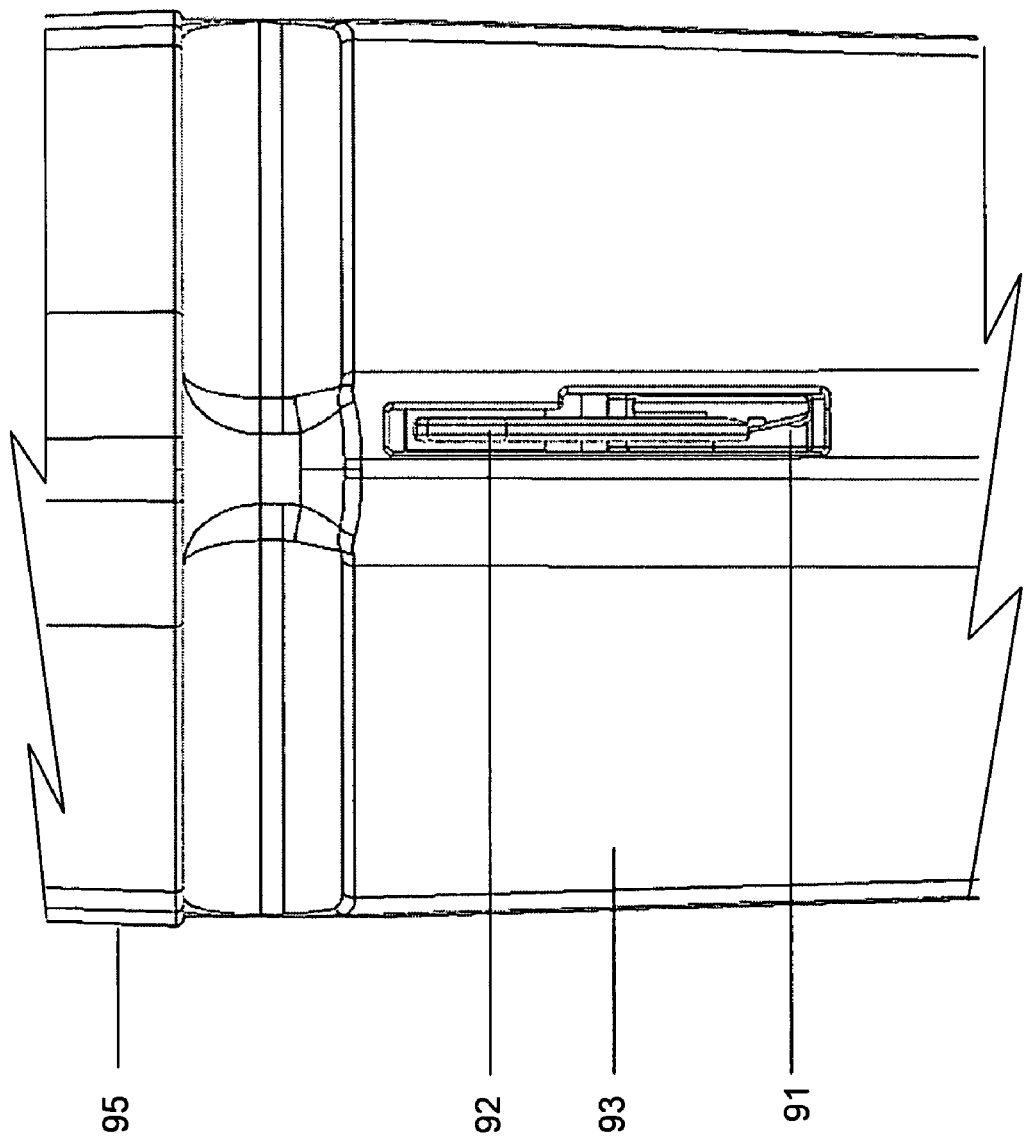

FIGS. 10 and 14 also show the device 70 in combination with a load securing device 80 adapted to restrain movement of a pair of stacked loads. The device 80 is similar to the load securing device illustrated in FIGS. 2-6. FIG. 14 shows the strap 84, one end (not shown) connected to the device 70 with the other end 86 connected to the vehicle at 88.

Referring again to the groove 79, the mating of the shape of the groove 79 with the D-ring of a strap, see FIG. 12, assists in positioning of the device 70 in the right orientation for load securement. In a typical use of the device 70, the D-ring-containing strap 84 and the device 70 are placed over the two top loads 61 and 63. Then the third load 60 is positioned to straddle the two loads 61 and 63. With the D-ring 82 of the strap 84 in the groove 79 of the device 70, a torsion spring (not shown but explained below) keeps the D-ring 82 from coming off the device 70. Also, since the D-ring 82 stays in the groove 79, it assists in maintaining the device 70 in its proper orientation so that when the strap 84 is tensioned, the surfaces 75 and 77 can engage the correct load surfaces so that the device 70 can function in its intended purpose.

While the device 70 is shown with a D-ring containing strap and complementary groove 79, other attachment techniques and configurations could be used to connect the device to a carrier, similar to that explained above for the load securing device of FIGS. 2-6.

The devices described above can also employ an alternative strap locking mechanism, which is different than the sliding mechanism shown for the securing device of FIGS. 8a and 8b. FIGS. 15-18 show a torsion spring 91 that is part of a device 90, which is similar to the load securing device of FIGS. 2-6. The torsion spring 91 is located in a slot 92 in the portion 93 of the device 90. When using the device 90 in combination with a D-ring-containing strap, the D-ring of the strap is slid over the portion 93. As the D-ring slides over the torsion spring 91, it is compressed back into the slot 92. Once the D-ring passes beyond the torsion spring 91, the spring expands and forms a barrier to movement of the D-ring back down the portion 93. In this embodiment, the upper portion 95 is bigger in cross sectional size than the D-ring so that the D-ring can only be removed by passing over the portion 93.

The upper portion 95 has a cross section similar to the embodiment shown in FIG. 7, which contrasts with the single rib shown in FIG. 5A for example. While the FIG. 7 embodiment shows a combination of lateral and longitudinal ribs, the upper portion 95 can be solidly molded or made such that the entire cross sectional body as it extends along the length of the load resisting member and away from the load bearing surfaces can be considered a rib, which contributes to the necessary strength to resist forces during use.

Figure 18:
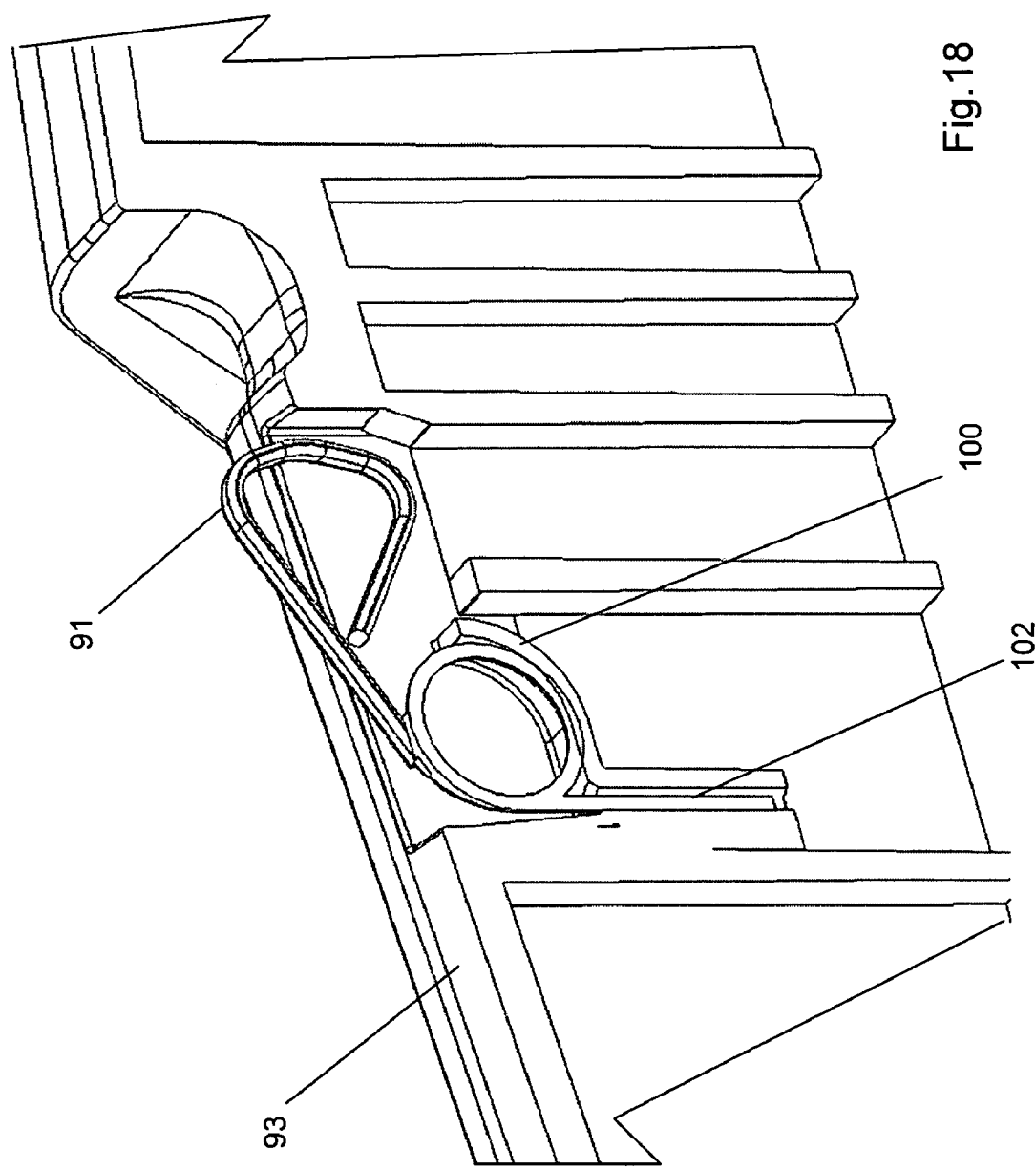

FIG. 18 shows a sectional view of the device showing the slot 92. The slot 92 has a lip 100 that engages part of the spring 91 and an opening that receives another part of the spring for retention purposes.

The torsion spring is also adapted for use with the device 70. As can be seen in FIG. 13, a slot 98 exists to receive the torsion spring. When using the torsion spring for the device 70, the problem of slipping off is in an upward direction, whereas the embodiment of FIGS. 2-6 positions the torsion spring to protect against downward movement of the strap. Thus, the torsion spring is located above the groove 79.

As such an invention has been disclosed in terms of preferred embodiments thereof, which fulfills each and every one of the objects of the invention as set forth above, and provides an improved device and method for securing loads during transport.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A method of securing stacked items on a carrier, comprising the steps of:
   a) providing a load resisting member having a body with a pair of load bearing surfaces; and a flexible member, one end of the flexible member secured to a central portion of the body of the load resisting member, another end of the flexible member being free;
   b) providing at least two loads stacked vertically on a carrier;
   c) positioning the flexible member between a space created by the two stacked loads;
   d) attaching the free end of the flexible member to the carrier; and
   e) tensioning the flexible member so that each load bearing surface of the body contacts a respective side portion of each load to resist forces applied in a direction of the load resisting member.

2. The method of claim 1, wherein a number of load resisting members are used horizontally.

3. The method of claim 1, wherein the stacked loads comprise at least three loads stacked vertically to create a pair of spaces, wherein steps (a), (c), (d), and (e) are performed using each of said pair of spaces.

* * * * *